United States Patent
Schmitz et al.

(10) Patent No.: US 6,760,401 B2
(45) Date of Patent: Jul. 6, 2004

(54) APPARATUS AND METHOD FOR PROCESSING OF DIGITAL IMAGES

(75) Inventors: Georg Schmitz, Wachtwerg (DE); Til Aach, Luebeck (DE); Peter Maria Johannes Rongen, Eindhoven (NL); Herman Stegehuis, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 38 days.

(21) Appl. No.: 10/215,692

(22) Filed: Aug. 9, 2002

(65) Prior Publication Data

US 2003/0053600 A1 Mar. 20, 2003

(30) Foreign Application Priority Data

Aug. 11, 2001 (DE) .......................... 101 39 708

(51) Int. Cl.[7] ............................ G01N 23/083
(52) U.S. Cl. ...................... 378/62; 378/98.8
(58) Field of Search .................... 378/4, 62, 98.2–98.12

(56) References Cited

U.S. PATENT DOCUMENTS

| | | | |
|---|---|---|---|
| 4,720,843 A | | 1/1988 | Haaker et al. |
| 6,252,931 B1 | * | 6/2001 | Aach et al. ................ 378/98.2 |
| 6,285,798 B1 | * | 9/2001 | Lee ............................ 382/260 |
| 6,424,730 B1 | * | 7/2002 | Wang et al. ............... 382/128 |
| 2002/0181797 A1 | * | 12/2002 | Young ....................... 382/260 |

FOREIGN PATENT DOCUMENTS

| | | |
|---|---|---|
| EP | 0 200 262 A2 | 11/1986 |
| EP | 0 200 262 B1 | 11/1986 |
| EP | 0 527 525 A2 | 2/1993 |
| EP | 0 527 525 B1 | 2/1993 |

OTHER PUBLICATIONS

Til Aach, Andre Kaup, "Statistical model–based change detection in moving video", Signal Processing 31 (1993), Elsevier; pp. 165–180.

Til Aach, Andre Kaup, "Bayesian algorithms for adaptive change detection image sequences using Markov random fields", Signal Processing: Image Communication 7 (1995) pp. 147–160.

Peter J. Burt, Edward H. Adelson, "The Laplacian Pyramid as a Compact Image Code", IEEE Transactions On Communications, vol. Com–31, No. 4, Apr. 1983, pp. 532–540.

T.M. Buzug, J. Weese and K.C. Strasters, "Motion Detection And Motion Compensation For Digital Subtraction Angiography Image Enhancement", Philips J. of Res., vol. 51, No. 2, 1998, pp. 203–229.

* cited by examiner

Primary Examiner—David V Bruce

(57) ABSTRACT

This invention relates to an apparatus and method for improved display of small dark structures such as in particular coronary blood vessels in digital X-ray images. A live image (S) is initially subjected to multiscale decomposition in which firstly multiple uses of low pass filtering with subsequent resolution reduction (RED), and secondly resolution increases using subsequent low pass filtration (EXP), give detailed images (D1, D2, D3, D4) of different resolution. In accordance with the first variant of the method, a mask (M) representative of the uninteresting image background is subtracted from the detailed image (D4) having the lowest degree of resolution. This ensures that the subtraction will only comprise correspondingly coarse structures with dimensions greater than the expected image motion. A further improvement can be achieved by applying a motion estimation (MOT EST) and motion compensation (MOT COMP) to the mask (M) and to the detailed image (D4) of the lowest degree of resolution. The detailed images (D1–D4) may be multiplied by factors ($c_2$) before they are combined to form the overall image (G). For this purpose, asymmetrical intensification functions are preferably used, so that negative contrast values corresponding to small dark structures can be intensified and positive contrast values can be suppressed.

20 Claims, 5 Drawing Sheets

APPARATUS AND METHOD FOR PROCESSING OF DIGITAL IMAGES

BACKGROUND

This invention relates to a method for processing digital images, in particular digitized X-ray images of the coronary blood vessels. Furthermore this invention relates to a method of achieving this objective.

In certain applications of methods for producing images, there arises the problem of intensification of small dark structures against a background which is of no interest. A representative example of this is the X-ray diagnosis of blood vessels, in particular coronary blood vessels. For diagnostic display of blood vessels, an X-ray-opaque contrast substance is frequently injected, so that the blood vessels through which the contrast medium passes appear on the X-ray image as dark, tube-like structures against the lighter background of bones, tissues and similar. For the purpose of obtaining even better display of the blood vessels, the X-ray image obtained is post-processed by Digital Subtraction Angiography (DSA) by subtracting a mask or a mask image from the actual X-ray image, so that the background contrast, but not the contrast of the blood vessels, is reduced. Generation of the mask images however is very difficult, in particular in displays of the heart, due to the movements of the patient himself and due to the heart beat.

A method and apparatus for contrast intensification in digital images is known from EP 0 527 525 B1. In this method, the digital image is first divided into N (N=1, 2, ...) detailed images with different resolution levels or spatial frequency ("Multi-Scale Decomposition"), where the nth detailed images (n<N) reproduce the image contrast corresponding to their resolution levels, i.e. approximately the difference from the mean gray-scale value for the particular resolution. The last, Nth, detailed image or "remanent image" yields an approximation to the original image, but without all the variations contained in the nth detailed images. After multi-scale decomposition, at least one of the detailed images is f-modified by means of a non-linear, monotonically increasing uneven conversion function (characteristic line) which has a gradient falling gradually with distance from the zero point, corresponding to multiplication of the pixel values by a symmetrical amplification function V which has a maximum>1 for pixel value zero. The relationship between the original image pixel values x and the modified pixel values y is expressed firstly by the conversion function or characteristic line f, and secondly by the intensification function V: $y=f(x)=V(x)\cdot x$. As a result of the said modification, weak contrasts—both dark structures against a light background, and light structures against a dark background—are intensified.

SUMMARY OF THE INVENTION

In view of this state of the art, it was an object of the present invention to provide an apparatus and a method to ensure improved display of image details, in particular details of coronary blood vessels.

This object is achieved by a method for processing digital X-ray images comprising the steps of decomposing the digital image into N (N=1, 2, ...) digital images of different spatial frequencies and where appropriate different bandwidth and modifying at least one of the detailed images, the modification including at least one of intensifying small dark structures and attenuating other structures. The method includes recombining the detailed images into a whole image after their modification.

The object of the invention is achieved by an apparatus for image processing of X-ray images comprising an X-ray detector for generating digital X-ray images and a data processing unit. The data processing unit comprising means for decomposing the digital image into N (N=1, 2, ...) digital images of different spatial frequencies and where appropriate different bandwidth, means for modifying at least one of the detailed images, the modification including at least one of intensifying small dark structures and attenuating other structures, and means for recombining the detailed images into a whole image after their modification.

The method according to the invention for processing of digital images and in particular digitized X-ray images of coronary blood vessels comprises the steps of:

decompositing the digital image into N detailed images of different spatial frequencies and, where appropriate, different bandwidth, where N is a real number N=1, 2, ...;

modifying at least one of the detailed images so obtained, such that small structures having a high absorption capacity, which appear dark in the digital image, are intensified and/or other structures are attenuated; and combining the detailed images after their possible modification to form a complete image.

The method proposed initially produces a multiscale decomposition of the digital image, so that detailed images are obtained with different resolution levels or spatial frequencies and, where appropriate, different bandwidth. Then the interesting structures are intensified and the uninteresting structures attenuated on the detailed images, which is generally considerably simpler in terms of computing effort than processing of the original digital image. The process can accordingly be carried out on images in real time. Furthermore, by selection of the modified detailed image it is possible to decide which spatial frequency and/or bandwidth of the original image is to be processed.

In accordance with a first embodiment of the process in particular the Nth detailed image, which by definition is the detailed picture with the lowest resolution and in certain variants of the multiscale decomposition is known as the "remanent image", is modified by subtraction of a mask of equally low resolution. In post-processing of images of coronary blood vessels by means of a mask representing the uninteresting background, there exists the problem that the correlation between the background of the actual image and the subtracted mask can be insufficient due to the movement of the patient and the heart. In order to reduce the resulting artifacts, according to the invention only such structures are considered in the mask to be subtracted which have an extent greater than the variance arising from the movement. As disclosed, this can be most simply achieved if the subtraction of a mask of equal resolution level only occurs in the Nth detailed image (remanent image) of the lowest resolution level.

More precise allowance for motion artifacts can be obtained by applying a motion estimation and motion compensation on the mask used before its subtraction from the Nth detail image (remanent image). In this way, the mask follows and adapts to the movements of the actual image background as well as possible, in order to minimize errors due to movement of the object shown.

In accordance with a preferred further development of the process, the mask used for subtraction is calculated from the dynamically obtained digital image by formation of the temporal maximum value pixel by pixel. Such a process has advantages for coronary diagnosis when a contrast substance is used, where a pixel associated with a blood vessel is subjected to darkening due to the transient occurrence of the contrast substance. If therefore the temporal maximum of the gray-scale is stored for each pixel, an approximate image free of the effects of the contrast substance is produced. Thus there is no need to take a separate exposure without contrast medium. Details of this procedure are to be found in EP 0 200 262 B1.

In accordance with a further embodiment of the process, the mask used is generated by N-times successive low pass filtering with subsequent reduction of resolution. In spatial low-pass filtering, high spatial frequencies i.e. small structures are suppressed. In the reduction of resolution, the number of pixels with which the entire image is produced is reduced. By means of said processing steps it is possible to adapt a mask which originated in the original digital image with original bandwidth and resolution, to the bandwidth and resolution level of the Nth detail image (remanent image).

For the purpose of generating detailed images, several possibilities arise in principle. In accordance with a preferred embodiment, which is also described as a Laplace Pyramid, the nth detail image (n<N) is obtained by subtracting the intermediate image gained from the original image by successive n times low-pass filtering with subsequent resolution reduction, with increase of resolution to reverse the last resolution reduction and by final low-pass filtering, from the intermediate image which was derived from the original image by means of successive (n−1) times low-pass filtering with subsequent resolution reduction. The Nth detailed image or so-called remanent image is preferably obtained by means of successive (N−1) times low pass filtering with subsequent reduction of resolution. The nth detail images (n<N) therefore contain the image contrast in their resolution level, i.e. approximately the difference from the mean gray-scale for the particular resolution level. The Nth detailed image or remanent image reproduces an approximation to the original image, with the omission of all variations contained in the nth detailed images. The complete image is finally assembled preferably successively for n=N, . . . 2 by calculating an (n−1)th intermediate image as the sum of the (n−1)th modified detailed image with the nth intermediate image modified by resolution increase with subsequent low-pass filtering, where the Nth intermediate image corresponds by definition to the modified Nth detailed image, and the first intermediate image corresponds by definition to the whole desired image. Details of such a process are to be found for example in EP 0 527 525 B1.

In a multiscale decomposition of the form explained above, or of a related form, the nth detailed image (n=1, . . . , N−1) can according to another embodiment be modified by application of an asymmetrical intensification function, which is greater in a negative interval [−b, −a] than in the corresponding positive interval [a, b]. In this case a and b are whole, non-negative numbers (a, b $\in$[0, $\infty$], where a<b. In addition, the intensification function should preferably be monotonically decreasing, non-linear and greater than 1 for negative pixel values. Negative pixel values in the detailed images correspond to small dark structures against a light background. Said intensification function is thus particularly suitable for intensifying the fine structures of blood vessels against other structures.

The two variants outlined above of the method in accordance with the invention, i.e. the subtraction of a mask from the remanent image (Nth detailed image) and the modification of the nth detailed images by means of a monotonically decreasing intensification function of the described form, are preferably applied simultaneously in order to gain the advantages of both methods. Because the modification of the nth detailed images does not include any particular allowance for motion effects, the weighting with which the two methods are related to each other is preferably varied as a function of the motion found for the subject of the digital image. In particular, with a medium motion (not too large) of the subject of the digital image, the proportion of subtraction of a mask can be weighted more heavily than the processing by modification of the nth detailed images.

In so far as the process in accordance with the invention includes detecting motion, this is preferably achieved by detection of changes between the mask used and the remanent image (Nth detail image) of the lowest resolution. As a result of restriction to an image of low resolution, such a detection can be carried out relatively rapidly, and thus in real time. In addition, it is automatically ensured that only movements of appropriate magnitude will be taken into account.

In accordance with a further embodiment of the process, the difference between a later and an earlier digital image is formed. Therefore, at points at which the difference image indicates motion of a dark structure in front of a light background, the intensification function will spread out. A spreading of the intensification function should indicate therefore that its extremes are moved further apart. In particular, the intensification function can be multiplied for values>1 by a factor>1, and for values<1 by a factor<1. Alternatively the intensification functions can be squared at any point. In order to explain the effects of said process, it may be assumed that the difference image is obtained by subtraction of an image $B_{t-1}$ at time (t−1) from an image $B_t$ at time t. Dark moving structures in front of light backgrounds are distinguished in the difference image by negative values in their new location, and by positive values in their old location. Under the assumption that it is primarily the interesting structures such as coronary blood vessels which move, the bio-modification in areas exhibiting motion (negative difference values) can be intensified; this is achieved by spreading of the intensification function in these locations. In this manner, motion can be readily detected and utilized to improve the imaging.

This invention relates ultimately to an apparatus for image processing of X-ray images, in particular of images of coronary blood vessels, where said apparatus contains an X-ray detector for generating digitized X-ray images, as well as a data processing unit for processing the digital images obtained. The data processing unit is arranged such that it can perform a process of the form explained above. This means that in particular it can carry out a multiscale decomposition of the digital image, modify the detailed images obtained in accordance with the invention, and finally re-combine the modified detailed images into a whole image.

The following description, claims and accompanying drawings set forth certain illustrative embodiments applying various principles of the present invention. It is to be appreciated that different embodiments applying principles of the invention may take form in various components, steps and arrangements of components and steps. These described embodiments being indicative of but a few of the various ways in which some or all of the principles of the invention may be employed in a method or apparatus. The drawings are only for the purpose of illustrating an embodiment of an apparatus and method applying principles of the present invention and are not to be construed as limiting the present invention.

BRIEF DESCRIPTION OF THE DRAWINGS

The foregoing and other features and advantages of the present invention will become apparent to those skilled in the art to which the present invention relates upon consideration of the following detailed description of apparatus applying aspects of the present invention with reference to the accompanying drawings, wherein.

DETAILED DESCRIPTION

Figure 1:
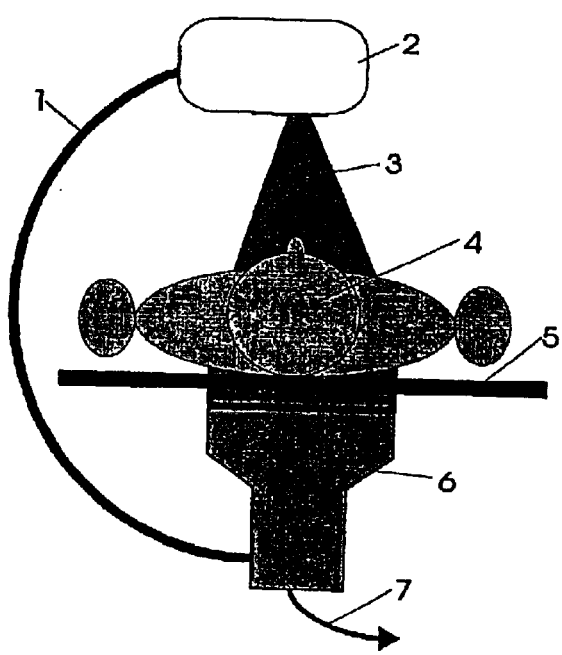
FIG. 1 is a schematic diagram of the components of an X-ray radioscopic system.

The method according to the invention is particularly suitable for use in image-producing X-ray systems such as fluoroscopy and radioscopy, which are capable of yielding live X-ray images. As shown in the procedure of FIG. 1, a patient 4 lying on a table 5 is exposed to X-rays 3, which are emitted by an X-ray source 2 mounted on a support 1. The X-rays 3 are differentially absorbed on their passage through the patient depending on the tissue structures, and detected under the patient by a suitable arrangement 6, for example by a chain consisting of an image amplifier and a camera, or by a flat dynamic X-ray detector (FDXD). The signal thus obtained is then decomposed into a sequence of digital images 7, which are fed to an image processing unit (not shown). There they can be processed and, where appropriate, displayed on a monitor.

Where an apparatus as shown in FIG. 1 is used to provide X-ray images of the coronary blood vessels, it is necessary to display the fine dark structures of the blood vessels more strongly against the background (bones, tissues). Furthermore the disruptive effects of the patient's own movements or heart movements should be reduced as far as possible.

Where the display of the blood vessels is improved by injection of a contrast medium, a mask representing the "normal" background can be subtracted from the live image obtained. In the simplest case, this mask is obtained before injecting the contrast medium, by producing separate X-ray images. Where no motion would occur between obtaining this mask and the subsequent live images, the mask can be used to subtract the background perfectly from the live image, thus leaving only the interesting blood vessels (T. M. Buzug, J. Weese, K. C. Strasters: Motion detection and motion compensation for digital subtraction angiography image intensification; Philips Journal of Research, 51(2): 203–229, 1998 incorporated herein by reference). The additional X-ray dosage involved in obtaining the mask can be avoided by calculating the mask, during injection of the contrast medium, as the recursive pixel by pixel maximum from the sequence of live images, so that the effects of the opaque contrast medium, which reduces the grey value, are removed (cf EP 0 200 262 B1). However, with these known procedures, movements caused by breathing or by heartbeats lead to an erroneous superposition between the mask and then live background image. Consequently subtraction of the mask from this background does not lead to perfect removal of the background, but can even cause motion artifacts. Although algorithms using motion compensation for off-line correction of small erroneous superpositions have been described, such algorithms are only semi-automatic and therefore not suitable for coronary image processing in real time.

Figure 2:
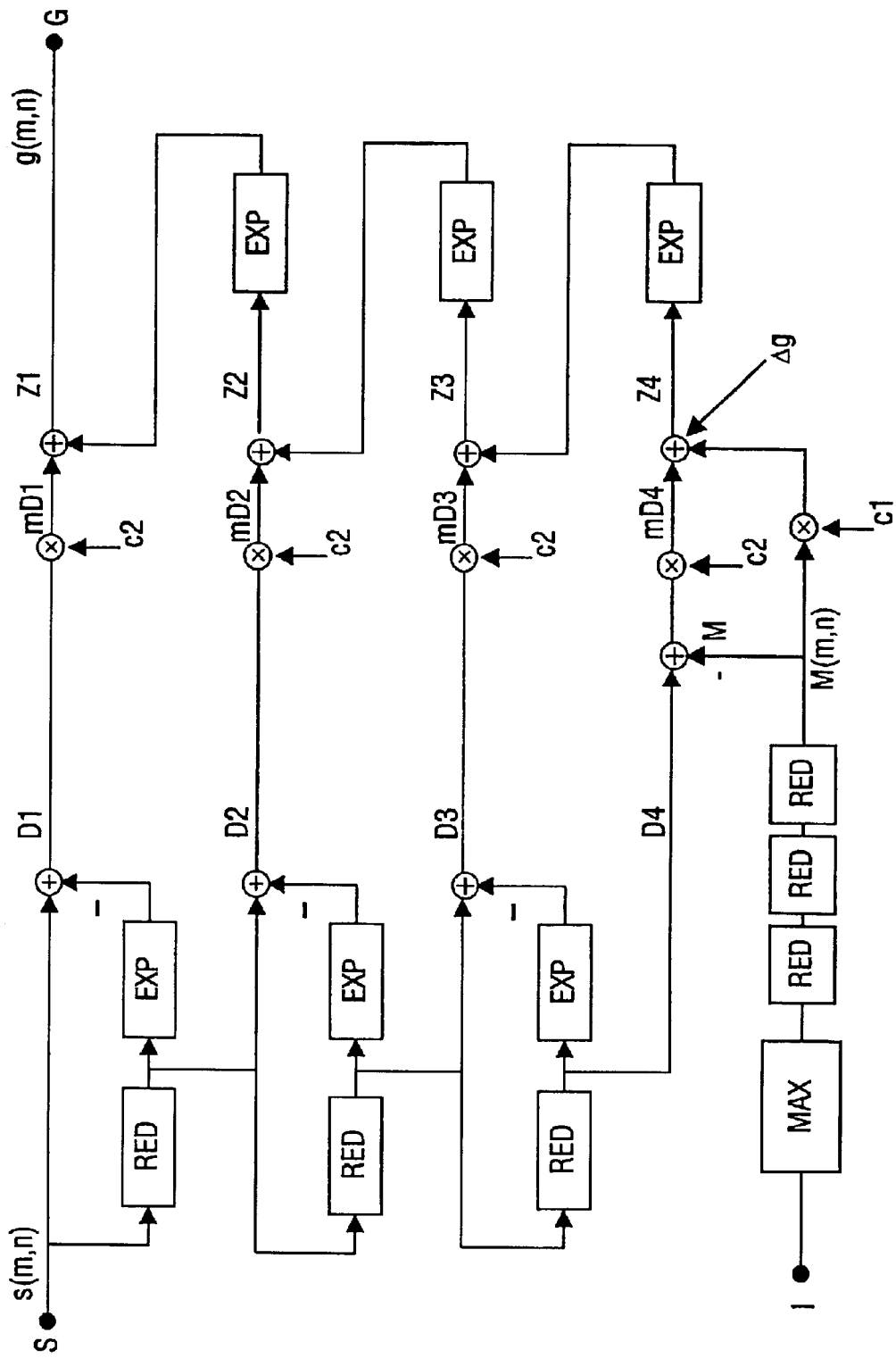
FIG. 2 is a first embodiment of image processing in accordance with the invention, with multiscale decomposition of the image and mask subtraction.

In accordance with the present invention, image processing for enhanced display of coronary blood vessels uses multiscale decomposition and image recombination, as explained below with the aid of FIG. 2. The multiscale decomposition and recombination illustrated there correspond to the Laplacian Pyramid (P. J. Burt, E. H. Adelson: The Laplacian Pyramid as a compact image code, IEEE Transactions on Communications, 31(4): 532–540, 1983, incorporated herein by reference). The original digital image S with pixel gray values s(m, n), where m and n are the co-ordinates for the line and column of the image, is decomposed into several detailed images D1, D2, D3, D4 which represent band-pass information or high-pass information. In FIG. 2 this is shown for a three-stage decomposition, although more steps are used in practice. Detailed images D1, D2, D3, D4 represent structures of various sizes, where D1 is the image with finest detail of highest resolution class. The lowest detailed image D4 in the Figure, also known as the remanent image, represents blurred low-pass information. In order to obtain this blurred image, several small low-pass cores with subsequent resolution reduction are used instead of a single widecovering low-pass core.

In detail, multiscale decomposition is carried out in the following manner: the original image S is initially slightly blurred in a small low-pass filter, and its resolution is subsequently "downsampled", i.e. represented by a smaller number of pixels. In a typical case, the number of pixels is reduced by a factor of 4. The information-reducing processes of low-pass filtering and resolution-reduction are represented in FIG. 2 by the blocks labeled as RED. The resolution of the resulting low-pass filtered and reduced resolution image is then increased in the block labeled EXP, i.e. restored to its original resolution, and is subsequently subjected to a small low-pass filter in order to blur artifacts produced by the increase of resolution. By means of the successive RED and EXP processes an only slightly blurred image is produced, which is then subtracted from the original image S so that the first detailed image D1 is generated. This first detailed image D1 thus contains only fine high-pass information, i.e. small structures which can be represented as image contrast values. The image contrast values therefore represent approximately the deviation of the pixel values from the mean gray-scale for the relevant resolution level. Dark structures in front of a light background will therefore have negative image contrast values. Detailed image D1 can be subsequently also be converted to a modified detailed image mD1, for example by multiplication of all image pixels by a weighting factor $c_2$.

The second detailed image D2 and the third detailed image D3 are fundamentally produced in a similar manner to the first detailed image D1, but the starting point is not the original image S, but the intermediate image behind processing block RED of the previous stage. For the nth detailed image (for example D3 for n=3) this intermediate image is the product of an (n−1) times application of the RED block, i.e. the low-pass filtering and resolution reduction. Detailed images D2, D3 can be reconverted into modified detailed images mD2, mD3 by multiplying them by a constant $c_2$.

The lowest detailed image D4 or the remanent image, in contrast to the preceding stages, is generated without subtraction of its copy processed by RED and EXP. Thus the detailed image D4 corresponds to (N−1)=3 times successive application of the RED blocks to the original image S. The pixels of the remanent image therefore constitute true gray-values, and not image contrast values as for the other detailed images. The remnant image therefore has a different character from the other detailed images, but to standardize the terminology is also referred to below as a "detailed image".

Detailed images D1 to D4 and modified detailed images mD1 to mD4 are successively recombined to a whole image G having pixel values g (m, n), as indicated in the right hand part of FIG. 2. This recombination commences with the lowest detailed image D4, which will have been previously converted into an intermediate image Z4 in accordance with the present invention, using procedures are described in detail below. The resolution of the intermediate image Z4 is first increased via a processing block EXP, and then low-pass filtered, in a similar manner to that already described in connection with the decomposition into detailed images. The sum of the resulting image and of the modified detailed image mD3 of the next higher stage yields the intermediate image Z3 of the higher stage. This in turn is processed by a block EXP, and added to the modified detailed image mD2 of the next higher stage in order to obtain the next higher intermediate image Z2, and so on. At the end there is obtained intermediate image Z1, which corresponds to the desired whole image G.

Whereas the Laplacian Pyramid has been described in particular above, in accordance with this invention it is possible to apply different decomposition techniques, such as wavelets or filter banks.

A decomposition and recombination procedure of the form explained above is now modified in accordance with the invention, in order to obtain a better imaging of blood vessel structures. The fundamental idea of the procedure in accordance with the invention, as outlined in FIG. 2, consists of making allowance for a moderate movement of the image background by means of mask subtraction from the live image, said subtraction being limited to structures having a spatial extent which is greater than the dimension of the (expected) movement. In order to remove all fine structures which cause artifacts such as double contours due to a movement, the mask image is blurred by means of a linear or non-linear low-pass filter. Then, the blurred mask is subtracted from the live image. In generating the mask, as explained above, a recursive pixel-wise maximum value generation can be used to remove the effects of the contrast medium. As shown in FIG. 2, the procedure of subtracting a blurred mask fits particularly well into the framework of multiscale decomposition. Subtraction may be combined with other algorithms for noise reduction or contrast intensification without necessitating additional effort.

For the purpose of combining mask subtraction with multiscale decomposition, the Laplacian Pyramid as described can be applied to the live image S in accordance with FIG. 2. The detailed image D4 (remanent image) at the lower end of the pyramid therefore represents large structures of the live image by gray-scale values. The extent of the blurring of the image can be adapted by suitable choice of the number of levels of the pyramid. Mask M, with pixel values M(m, n) is determined from the live images I by calculation of the pixel temporal maximum (generally I=S) as explained above. This operation is represented in FIG. 2 by the block labeled MAX. Then the image obtained is subjected to as many low-pass filtration processes with subsequent resolution reduction (represented together by the block RED) as there are levels in the decomposition pyramid. This ensures that the mask will at the end have the same resolution and blurring as the lowest detailed image or remanent image D4. The mask M so obtained is subtracted from the remanent mask D4. This ensures that the mask subtraction will only affect relatively coarse structures which do not cause disturbing artifacts, even with movement.

As may be further understood from FIG. 2, the amount of mask subtraction can be controlled by further addition of a part of mask M, which is determined by the magnitude of factor $c_1$. This part is added to the modified detailed image mD4, which was obtained from the detailed image D4 by subtracting mask M and subsequently multiplying by factor $c_2$. The brightness of the whole image can finally be controlled by adding a constant $\Delta g$ (all said operations on the images should always be considered one pixel at a time). The intermediate image Z4 obtained by these means is then combined with the other detailed images D1 to D3 to form the whole image G.

Figure 3:
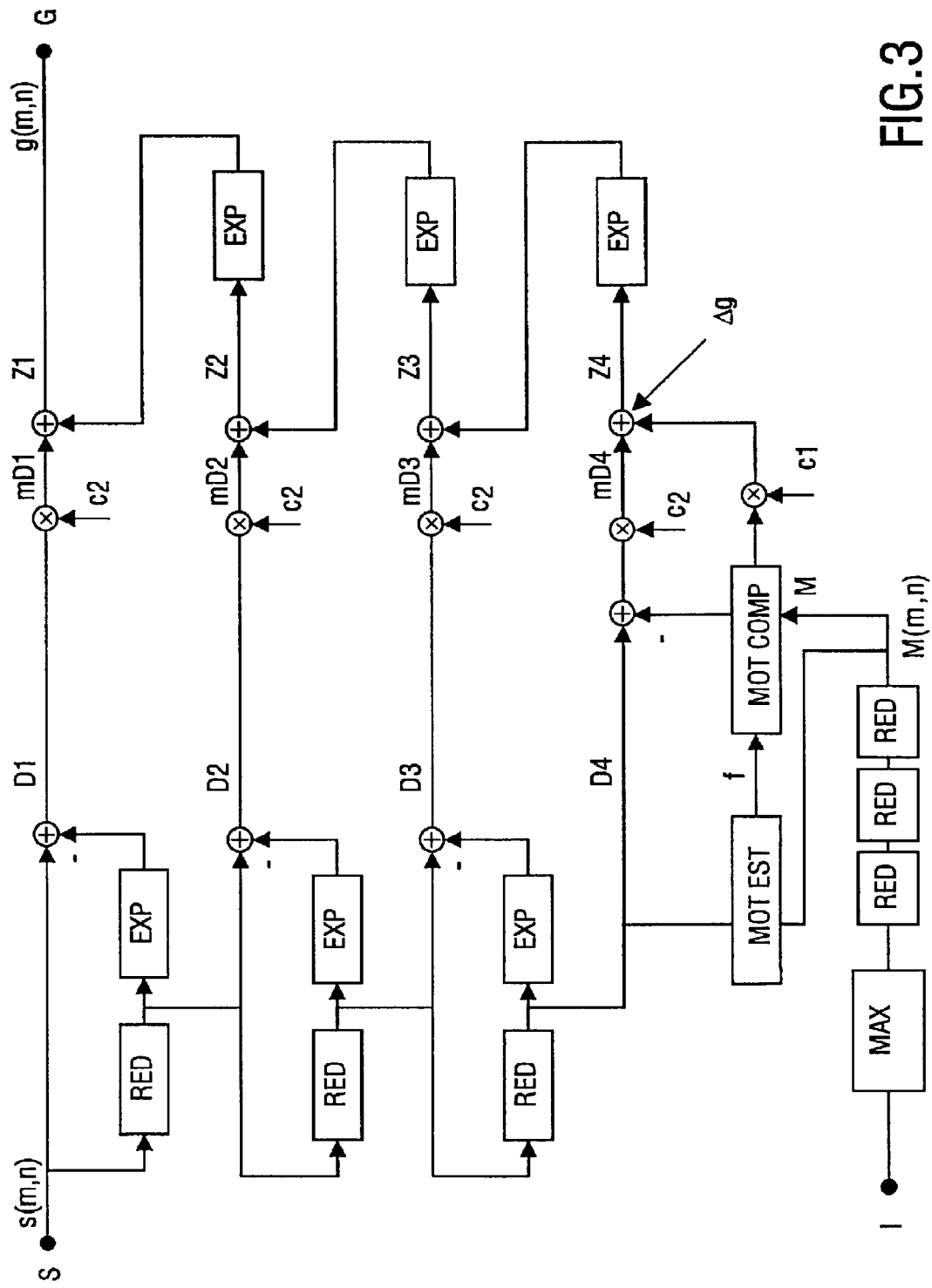
FIG. 3 is a second embodiment as a variation of the process in accordance with FIG. 2, where motion estimation and motion compensation is also carried out.

FIG. 3 shows an extension of the procedure shown in FIG. 2, where only the newly added components will be described. In the procedure outlined in FIG. 3, partial motion compensation is introduced. Motion compensation tries to remove or reduce the artifacts caused by erroneous superposition between mask and the live image by defining and taking into account the image background movement. Motion estimation on the original image is however very difficult and requires appreciable calculation effort, which often prevents the use of this procedure.

However, such problems are avoided by the procedure in accordance with this invention. Here a motion estimation MOT EST is connected between the remanent image D4 of the lowest resolution stage and the (low-pass filtered and resolution-reduced) mask image M, in order to define a relative movement and calculate an appropriate vectorial motion field f. On the basis of the motion field f obtained, motion compensation can be carried out on mask M in block MOT COMP so that said mask is aligned as well as possible with the remanent image D4 before being subtracted from this. The advantage of utilizing the motion estimation and motion compensation as illustrated in FIG. 3 is that this need only be carried out on the reduced-resolution images D4 or M. These images are appreciably smaller than original images S or I. If for example the original image contains 1024×1024 pixels and a five-level pyramid is used, then the mask and remanent image consist of only 64×64 pixels. Application of motion estimation and compensation between images of such low resolution level therefore also becomes possible in real time.

Figure 4:
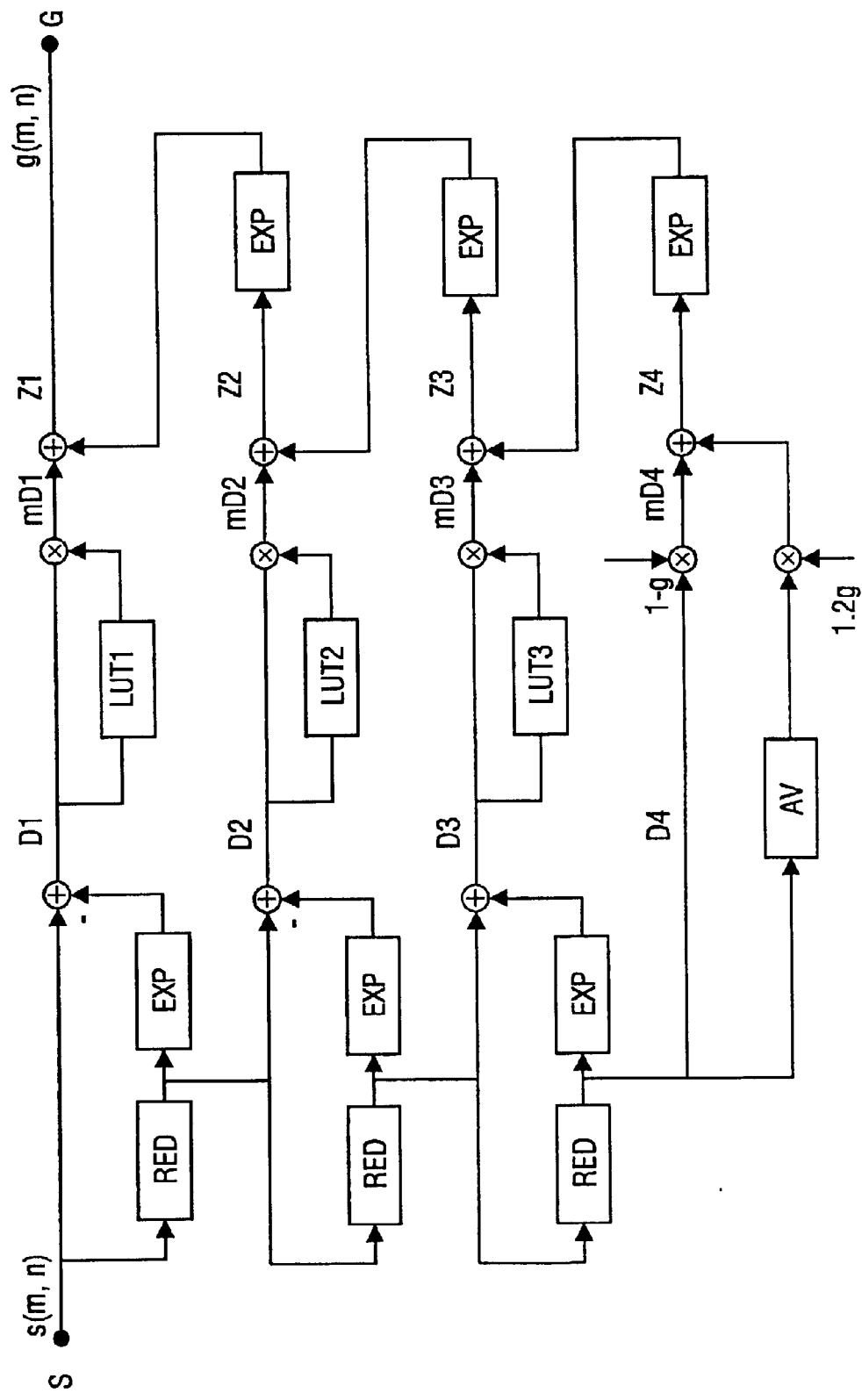
FIG. 4 is a third embodiment of image processing with multiscale decomposition and modification of the detailed images.

FIG. 4 shows an alternative approach to intensification of blood vessel display using multiscale decomposition. In so far as the diagram of FIG. 4 corresponds to the diagrams of FIGS. 2 and 3, reference should be made to the descriptions there. The basic idea for an approach in accordance with FIG. 4 consists of isolating and enhancing the blood vessels filled with contrast medium separately in each of the detailed images D1 to D3, before the detailed images are recombined to form the whole image.

Blood vessels are absorbent (i.e. dark) structures of medium or small size. In the highest level of the decomposition pyramid, the blood vessels appear as dark structures of small diameter in front of a light background. The image contrast values associated with blood vessels therefore have a negative prefix (difference between gray-scale and mean gray-scale). Enhancement of the blood vessels and suppression of the background becomes possible if the image contrast values having negative prefixes are intensified and/or the image contrast values having a positive prefix are attenuated for each detailed stage D1 to D3, except for the lowest detail stage of remanent image D4. The associated intensification functions are preferably stored in lookup tables LUT1, LUT2, LUT3.

Figure 5:
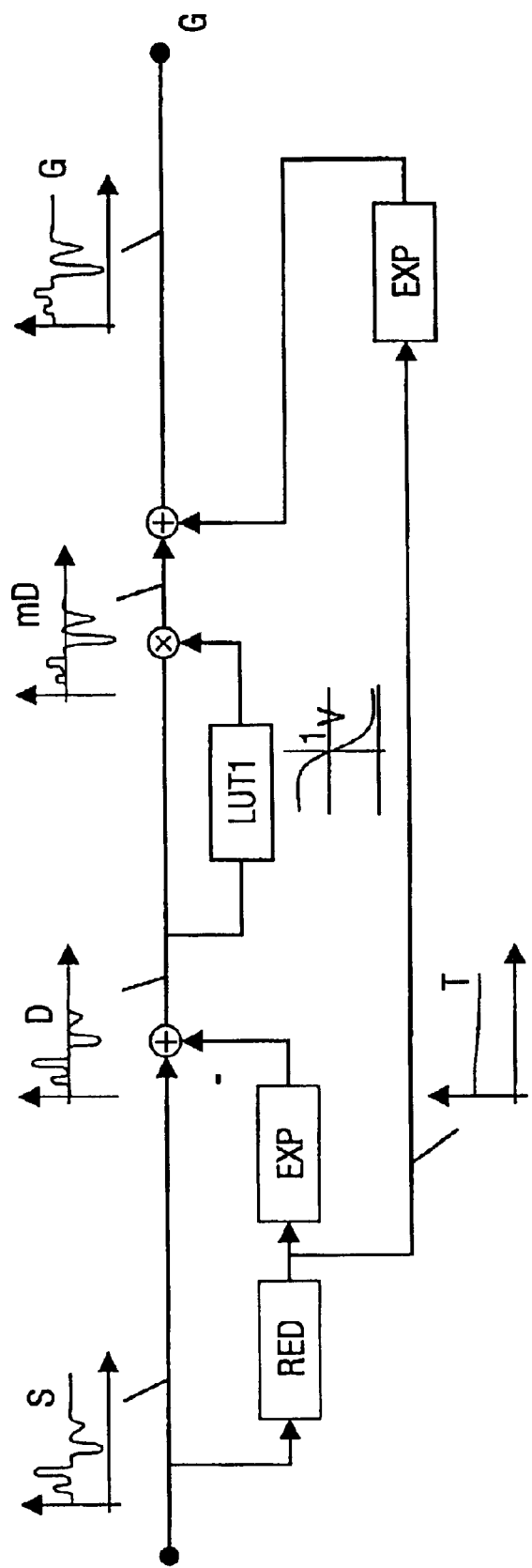
FIG. 5 is a simplified block diagram of image processing in accordance with FIG. 4, with examples of images in various stages of processing.

The effect of the said processing is illustrated diagrammatically in FIG. 5 on the basis of a simplified single-step multiscale decomposition. The original one-dimensional image S exhibits light (peaks upward) and dark (peaks downward) structures against a background of medium gray-scale, where the dark structures correspond to the blood vessels to be displayed. By means of low-pass filtration and reduction of resolution RED, the original image S is converted to low-pass image T which represents approximately the mean gray-scale. Subtraction in block EXP of this low-pass image T, whose resolution has again been increased and then low-pass filtered, from the original image S produces the detailed image D. The pixel values for said image D thus represent contrasts, i.e. the differences of the relevant gray-scales from the mean gray-scale value, where the negative contrasts correspond to the blood vessel structures.

Then the pixel values of detailed image D are multiplied by the intensification function V stored in table LUT1. Because the intensification function V is greater than 1 for negative contrasts, and less than 1 for positive contrasts, the modified detailed image mD will show the negative contrasts (dark over light background) in intensified form, and the positive contrasts (light on dark background) in attenuated form. In order to intensify only particular structures, the intensification function V for high negative contrasts can again be smaller, which is not shown in detail in FIG. 5. Such an intensification function V would thus be less than 1 starting from minus infinity, then would rise to values>1 for relatively low negative contrasts x, fall slightly for relatively small positive contrasts and then fall by a greater amount for large positive contrasts. The associated characteristic curve f, which is connected with intensification function V in accordance with $y=f(x)=V(x) \cdot x$ increases monotonically and is asymmetric.

The desired whole image G, with the blood vessels intensified as required, is then obtained after adding the resolution-intensified and subsequently low-pass filtered low pass image T to the modified detailed image mD.

Figure 6A:
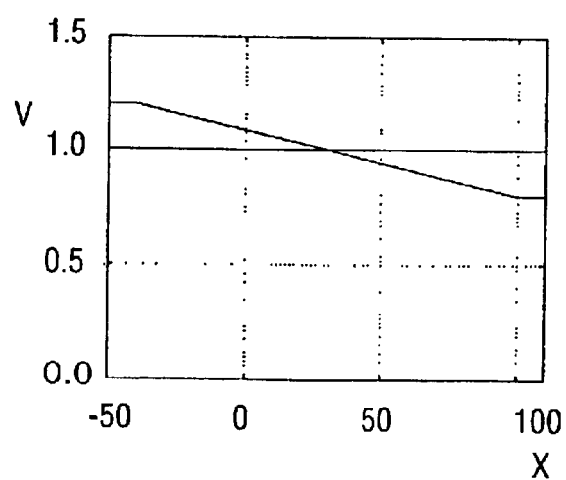
FIGS. 6A and 6B show two variations of the intensification function used in the method according to FIG. 4.
Figure 6B:
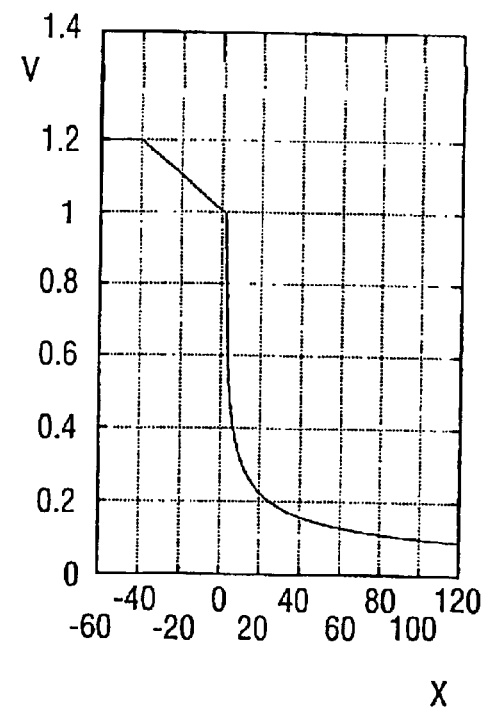

FIGS. 6A and 6B show two examples of possible intensification functions, where the horizontal axis represents image contrast values x and the vertical axis represents intensification factor V. Function of FIG. 6A corresponds to an intensification function with slight attenuation of coarse structures, and function of FIG. 6B represents an intensification function with great attenuation of coarse structures.

Further emphasis of fine structures can be obtained in accordance with FIG. 4, by attenuating remanent image D4, having the lowest resolution, by a factor (1−g), where ($0 \leq g \leq 1$). In order to avoid loss of overall brightness of the image due to this attenuation, the global mean value of remanent image D4, as calculated in block AV and of constant value, is again added to the attenuated detailed image after being intensified by a factor 1.2 g.

The algorithm shown in FIG. 4 is based entirely on individual images, with no allowance for temporal information from the image sequence. On the other hand, the algorithms in FIGS. 2 and 3 are based entirely on mask subtraction for image improvement, but not on contrast-dependent intensification according to FIG. 4 which emphasizes the vascular information. Preferably therefore the procedures in FIGS. 2/3 and 4 are combined. In the simplest case, this can be achieved by replacing the constant intensification factors $c_2$ of FIGS. 2 or 3 by intensification functions LUT1, LUT2 and LUT3 in accordance with FIG. 4. Where desired, the effect of the intensification factors $c_2$ can be readily integrated into the intensification functions.

In addition, the combination of mask subtraction and intensification functions can be structured to be motion adaptive. The algorithm in FIG. 4 is independent of movements because it is based solely on individual images. The algorithms in FIGS. 2 and 3, however, can fail in the case of very strong movements. Thus it is preferred to determine the extent of the existing movement in the image for example by using motion detection on live images or on the low-pass filtered images resulting from multiscale decomposition in FIG. 3. Suitable algorithms for motion detection are described for example by Til Aach, Andre Kaup and Rudolf Mester: Statistical model-based change detection in moving video (Signal Processing, 31(2): 165–180, 1993, incorporated herein by reference), or by Til Aach and Andre Kaup: Bayesian algorithms for change detection in image sequences, using Markov random fields (Signal Processing: Image Communication, 7(2): 147–160, 1995, incorporated herein by reference). Alternatively, for motion-compensated mask subtraction in accordance with FIG. 3, the extent of movement can be determined from the calculated motion vector field f between the mask and the remanent image. The relative proportions of the mask subtraction algorithm (FIG. 2 and FIG. 3) and of the intensification function algorithm (FIG. 4) can then be weighted in accordance with the extent of the movement found. The more movement detected, the greater the weight allocated to the intensification function algorithm; the less movement detected, the greater the weight given to mask subtraction.

Methods in accordance with the invention thus allow improved display of fine structures, such as particularly of coronary blood vessels, with the same X-ray radiation dosage and the same quantity of contrast medium. As an alternative, to achieve an equivalent display of blood vessels, the X-ray radiation dosage and/or the quantity of contrast medium can be reduced, so as to minimize the stress on patients.

The invention is of course not limited to the described or shown embodiments, but generally extends to any embodiment, which falls within the scope of the appended claims as seen in light of the foregoing description and drawings. While a particular feature of the invention may have been described above with respect to only one of the illustrated embodiments, such features may be combined with one or more other features of other embodiments, as may be desired and advantageous for any given particular application. From the above description of the invention, those skilled in the art will perceive improvements, changes and modification. Such improvements, changes and modification within the skill of the art are intended to be covered by the appended claims.

Having described a preferred embodiment of the invention, the following is claimed:

1. A method for processing digital X-ray images of a subject, the method comprising:

injecting the subject with a contrast agent;

decomposing the digital image into N (N=1, 2, ...) digital images of different spatial frequencies and where appropriate different bandwidth;

modifying at least one of the detailed images, the modification including at least one of intensifying small dark structures and attenuating other structures; and recombining the detailed images into a whole image after their modification.

2. The method of claim 1 wherein the Nth detailed image having the coarsest resolution is modified by subtraction of a mask having the same resolution level.

3. A method for processing a digital image including:

decomposition of the digital image into N detailed images of different spatial frequencies;

modification of the Nth detailed image having the coarsest resolution by subtraction of a mask having the same resolution level;

motion estimation and motion compensation applied to the mask before its subtraction and recombination of the modified detailed images into a whole image.

4. A method for processing a digital image including:

decomposing the digital image into N detailed images of different spatial frequencies;

modifying the detailed image having the coarsest resolution with a subtraction mask which is calculated from dynamically derived digital images by determining a pixel temporal maximum value; and recombining the modified detailed images into a whole image.

5. The method of claim 2 wherein the mask is calculated by means of successive multiple low-pass filtering with subsequent resolution reduction.

6. A method of for processing a digital image including:

decomposing an original image into N detailed images of different spatial frequencies;

modifying at least one of the detailed images, the modification including at least one of intensifying small dark structures and attenuating other structures;

calculating n intermediate images with increased resolution (n=1, 2, ..., N-1) from the original image by:
  recursive n-times low-pass filtration with subsequent resolution reduction,
  a resolution increase reversing the last resolution reduction, and
  a low-pass filtering process, calculating an nth detailed image (n=1, 2, ..., N-1) by subtracting the nth intermediate image from an (n-1)th intermediate image which was derived from the original image by recursive (n-1) times low-pass filtration with subsequent resolution reduction;
  recursively deriving the Nth detailed image (remanent image) from the original image by successive (N-1) times low-pass filtering with subsequent resolution reduction; and combining N modified intermediate images into a whole image successively for n=N, ... 2 by calculation of an (n-1)th modified intermediate image as a sum of an(n-1)th modified detailed image and an nth modified intermediate image which is converted from the nth modified image by a resolution increase with subsequent low-pass filtering.

7. The method of claim 6 including:

modifying the nth detailed image (n=1, ..., N-1) by application of an asymmetrical intensification function which is greater during a negative interval (b>a≧0) than during the corresponding positive interval, wherein the intensification function is at least one of monotonically decreasing, non-linear and greater than 1 for negative pixel values.

8. A method for image processing including:

decomposing the image into N detailed images having different spatial frequencies;

detecting background motion in the image;

modifying the Nth detailed image having the coarsest resolution, the modifying including:
  in accordance with an extent of the detected motion, relative weighting of at least one of a subtraction mask having the same resolution level as the Nth image and an asymmetrical intensification function which is greater during a negative interval (b≧a≧0) than during the corresponding positive interval, the intensification function being at least one of monotonically decreasing, non-linear and greater than 1 for negative pixel values, and
  at least one of applying the subtraction mask and the intensification function to the Nth detailed image; and recombining the detailed and modified images into a whole image.

9. The method of claim 8 wherein the motion is established by detection of changes between the mask and the Nth detailed image having coarsest resolution.

10. The method of claim 7, wherein the difference between a later and an earlier digital image is formed, and the intensification function is spread at those points where the difference image shows motion of a dark structure against a light background.

11. An apparatus for digital image processing of X-ray images of a subject injected with a contrast medium, the apparatus comprising:

an X-ray detector for generating digital X-ray images; and a data processing unit programmed to perform the steps of:
  decomposing the digital image into N (N=1, 2, ...) detailed digital images of different spatial frequencies and where appropriate different bandwidth;
  modifying at least one of the detailed images, the modification including at least one of intensifying vessels filled with the contrast medium and attenuating other structures separately in each detailed image; and
  recombining the detailed images into a whole image after their modification.

12. The apparatus of claim 11, wherein the programmed steps further include:

modifying the Nth detailed image having the coarsest resolution by subtraction of a mask having the same resolution level.

13. An apparatus for digital image processing including:

a means for decomposing a digital image into N detailed digital images of different spatial frequencies;

a means for modifying at least one of the detailed images, the modification including at least one of intensifying small dark structures and attenuating other structures;

a means for modifying the Nth detailed image having the coarsest resolution by subtraction of a mask having the same resolution level;

a means for estimating motion, and a means for calculating compensation factors applied to the mask before its subtraction; and a means for recombining the modified detailed images into a whole image.

14. An apparatus for digital image processing including:

a means for decomposing a digital image into N detailed digital images of different spatial frequencies;

a means for modifying at least one of the detailed images, the modification including at least one of intensifying small dark structures and attenuating other structures;

a means for modifying the Nth detailed image having the coarsest resolution by subtraction of a mask having the same resolution level;

a means for calculating the mask from dynamically derived digital images by means of formation of the pixel temporal maximum value; and a means for recombining the modified detailed images into a whole image.

15. The apparatus of claim 12, wherein the programmed steps further include:

calculating the mask by successive multiple low-pass filtering with subsequent resolution reduction.

16. An apparatus for digital image processing including:

a means for decomposing an original digital image into N detailed digital images of different spatial frequencies;

a means for modifying at least one of intensifying small dark structures and attenuating other structures;

a means for calculating an nth detailed image (n=1, 2, ... N−1) by subtraction of an nth intermediate image with increased resolution, which was derived from the original image by:

recursive n-times low-pass filtration with subsequent resolution reduction, a resolution increase reversing the last resolution reduction and a low-pass filtering process, from an (n−1)th intermediate image which was derived from the original image by recursive (n−1) times low-pass filtration with subsequent resolution reduction;

a means for deriving the Nth detailed image from the original image by successive (N−1) times low-pass filtering with subsequent resolution reduction; and a means for combining N modified intermediate images into a whole image successively for n=N, . . . 2 by calculation of an (n−1)th modified intermediate image as a sum of an (n−1)th modified detailed image and a nth modified intermediate image which is converted from the nth modified image by a resolution increase with subsequent low-pass filtering.

17. The apparatus of claim 16 including:

a means for modifying the nth detailed image (n=1, . . . , N−1) by application of an asymmetrical intensification function which is greater during a negative interval (b>a≧0) than during the corresponding positive interval, where the intensification function is at least one of monotonically decreasing, non-linear and greater than 1 for negative pixel values.

18. An apparatus for digital image processing including:

a means for detecting background motion in the digital image; and a means for modifying the Nth detailed image having the coarsest resolution, which modifying means includes:

a means for determining weighing factors in response to the detection of an extent of the motion, of at least one of a subtraction mask having the same resolution level as the Nth image and asymmetrical intensification function which is greater during a negative interval (b>a≧0) than during the corresponding positive interval, wherein the intensification function is at least one of monotonically decreasing, non-linear and greater than 1 for negative pixel values, and a means for applying at least one of a weighted subtraction mask and a weighted intensification function to the Nth image; and a means for recombining the detailed and modified images into a, whole image.

19. The apparatus of claim 18, wherein the motion is established by detecting changes between the mask and the Nth detailed image having coarsest resolution.

20. The apparatus of claim 17 including:

a means for forming a difference image between a later and an earlier digital image, wherein the intensification function is spread at those points where the difference image shows motion of a dark structure against a light background.

* * * * *